Patented Dec. 30, 1930

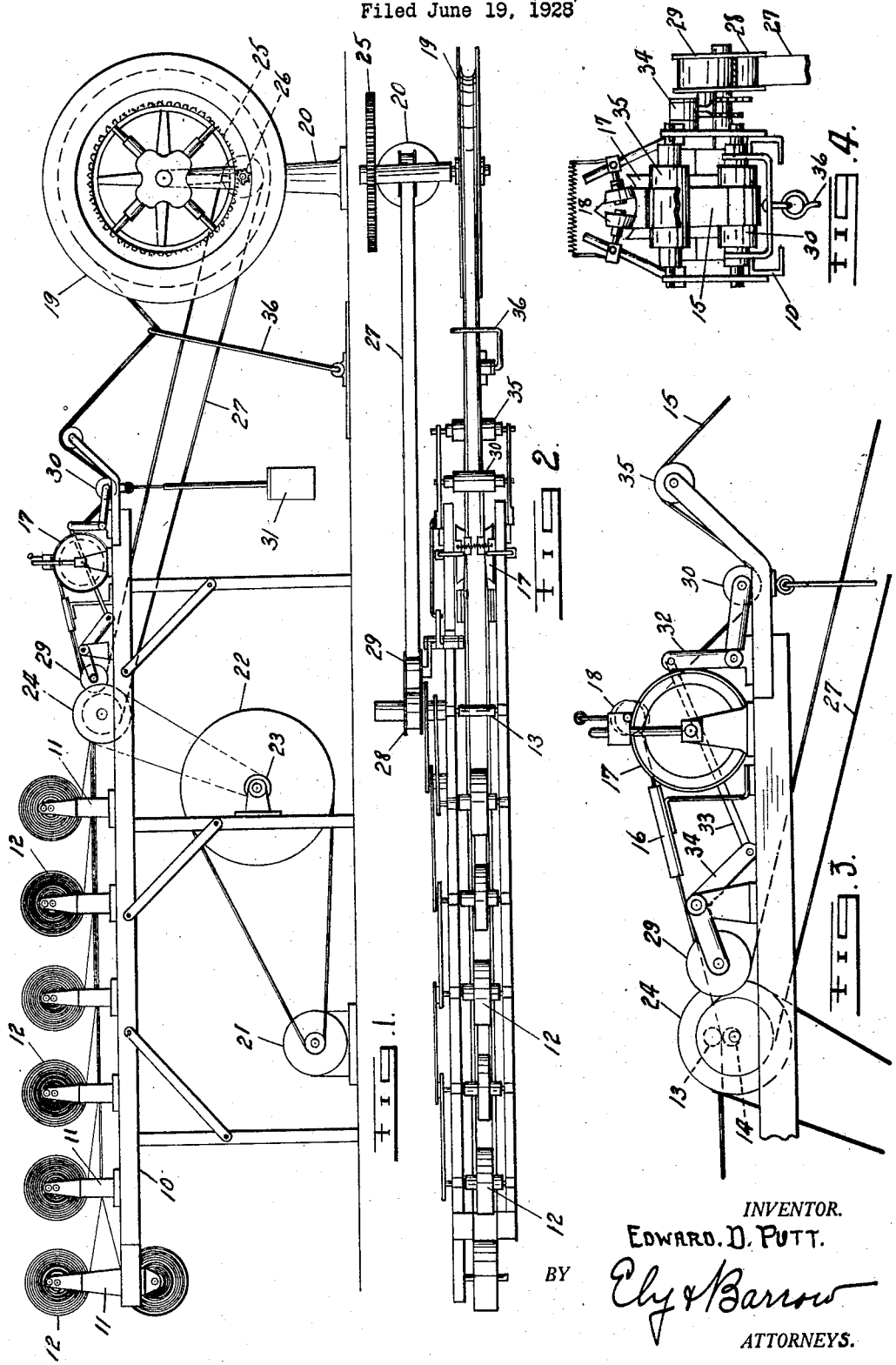

1,787,168

UNITED STATES PATENT OFFICE

EDWARD D. PUTT, OF AKRON, OHIO, ASSIGNOR TO THE FIRESTONE TIRE & RUBBER COMPANY, OF AKRON, OHIO, A CORPORATION OF OHIO

TIRE-FLAP MAKING APPARATUS

Application filed June 19, 1928. Serial No. 286,693.

This invention relates to continuous strip material assembling machines and has particular reference to improvements in tire flap making apparatus such as disclosed in the patent to Stevens, No. 1,169,204 granted January 25, 1916.

Machines of this type used for the commercial production of tire flaps comprise means for assembling a plurality of strips of rubberized and plain fabric to form a composite continuous band, and means for reeling said band directly onto vulcanizing drums or forms. An object of the present invention is to devise means for applying a uniform tension to the composite band as it is reeled upon the vulcanizing form. A further object is to devise means for driving the reeling device from the assembly machine drive, said means being governed by the tension of the composite band as it is wound upon the vulcanizing form.

The foregoing and other objects are obtained by the construction illustrated in the accompanying drawings and described below. It will be understood that the invention is not limited to the specific form thereof described herein.

Of the accompanying drawings,

Figure 1 is a side elevation of a flap making and reeling machine illustrated in connection with a tensioning device embodying the principles of the invention;

Figure 2 is a plan view thereof;

Figure 3 is an enlarged scale detail of the tensioning device; and

Figure 4 is an end elevational detail thereof.

Referring to the drawings, the numeral 10 denotes a frame or table on which are supported a plurality of standards 11 for holding reels 12 of continuous strip material. The strips are laid upon one another and pressed by rollers 13 and 14 into a continuous composite laminated band 15, the margins of the lower ply of fabric being folded about the edges of the inner plies of the band as the latter passes over guide plate 16 and wheel 17 and under spring-pressed rollers 18, the band being then ready for reeling upon the vulcanizing reel or spool 19 which is rotatably mounted on standard 20. Motor 21 acting through reducing pulleys 22 and 23 rotates a pulley 24 for driving the various parts of the machine. Reel 19 is driven through gear 25 and pinion 26 by means of a belt 27 trained over a pulley 28 driven by pulley 24. Uniform tension is maintained in band 15 by means of an idler pulley 29 which tightens or loosens belt 27 to drive reel 19 faster or slower. Idler 29 is governed by tension in the composite band 15 by means of roller 30 pulled against the belt by means of weight 31 to actuate bell-crank 32 on one end of which roller 30 is journaled. The motion of bell-crank 32 is imparted through link 33 to a second bell-crank 34 on which idler pulley 29 is journaled. Strip 15 after passing over wheel 17 is threaded under roller 30 over a guide roller 35 and under a guide bar 36 from whence it is reeled onto spool 19.

In the operation of the tensioning device, as the tension in band 15 is diminished, roller 30 is correspondingly lowered, actuating bell-cranks 32 and 34 to press idler 29 more tightly against driving belt 27. The increased friction of the latter belt against drive pulley 28 tends to speed up the revolution of reel 19. As the tension increases the band raises roller 30 against the action of weight 31 and diminishes the pressure of idler 29 against belt 27 to lessen the speed of rotation of reel 19. Any desired degree of tension can be imparted to the band by increasing or decreasing the mass of weight 31. It will be seen that a device is thus provided for effectively imparting a uniform tension to the flap material as it is wound upon the vulcanizing drum, and that the peripheral speed and tension of the material on the drum is maintained substantially constant throughout the reeling process regardless of the increasing diameter of the material as it is wound upon the reel.

Modifications of the device may be resorted to without departing from the spirit of the invention or from the scope of the appended claims.

What is claimed is:

1. The combination of apparatus for assembling and compressing a plurality of continuous rubberized strips of material to form a laminated tire flap band, means for driving said apparatus, means for reeling said band onto a vulcanizing form, means for driving said form from said apparatus driving means, a weighted roller engageable with said band between said apparatus and said form for maintaining tension in said band, and means actuated by said roller for increasing or diminishing the speed of the reeling means as the tension in said band is respectively diminished or increased.

2. The combination of apparatus for assembling and compressing a plurality of continuous strips of material into a composite band, means for driving said apparatus, means for reeling said band onto a form, a belt for driving said form from said driving means, means governed by the tension in said band for controlling said form driving belt, said means including a weighted roller engaged with the band between the apparatus and the form and an idler pulley pressing against the driving belt, and links positively connecting said weighted roller to said idler pulley, whereby when the band slacks up the weighted roller will force the idler pulley against the belt to make it drive more positively, thus increasing the speed of the form.

In witness whereof I have hereunto affixed my signature this 15th day of June, 1928.

EDWARD D. PUTT.